(12) United States Patent
Pandurangan

(10) Patent No.: US 7,729,953 B2
(45) Date of Patent: Jun. 1, 2010

(54) ACQUISITION OF ONLINE AUCTION ITEMS THROUGH A GLOBAL POSITIONING SYSTEM

(75) Inventor: Senthil K. Pandurangan, San Jose, CA (US)

(73) Assignee: eBay Inc., San Jose, CA (US)

( * ) Notice: Subject to any disclaimer, the term of this patent is extended or adjusted under 35 U.S.C. 154(b) by 121 days.

(21) Appl. No.: 11/870,542

(22) Filed: Oct. 11, 2007

(65) Prior Publication Data

US 2009/0099951 A1 Apr. 16, 2009

(51) Int. Cl.
*G06F 17/60* (2006.01)

(52) U.S. Cl. .............................. 705/26; 706/27; 706/37; 706/14

(58) Field of Classification Search .................... 705/26, 705/27, 37, 14
See application file for complete search history.

(56) References Cited

U.S. PATENT DOCUMENTS

| | | | |
|---|---|---|---|
| 6,675,165 B1 | 1/2004 | Rothschild | |
| 6,988,103 B2 | 1/2006 | Chithambaram et al. | |
| 6,988,109 B2 | 1/2006 | Stanley et al. | |
| 7,076,460 B2 * | 7/2006 | Dinwoodie | 705/37 |
| 7,080,096 B1 | 7/2006 | Imamura | |
| 7,092,957 B2 | 8/2006 | Klein | |
| 7,107,285 B2 | 9/2006 | von Kaenel et al. | |
| 7,200,566 B1 * | 4/2007 | Moore et al. | 705/26 |
| 2001/0049636 A1 * | 12/2001 | Hudda et al. | 705/26 |
| 2001/0056396 A1 * | 12/2001 | Goino | 705/37 |
| 2002/0029181 A1 * | 3/2002 | Miller et al. | 705/37 |
| 2002/0038353 A1 | 3/2002 | Yamamoto | |
| 2002/0069126 A1 * | 6/2002 | Matsushima | 705/26 |
| 2002/0087522 A1 * | 7/2002 | MacGregor et al. | 707/3 |
| 2002/0103713 A1 * | 8/2002 | Kim | 705/26 |
| 2003/0061211 A1 | 3/2003 | Shultz et al. | |
| 2006/0099964 A1 * | 5/2006 | Barrese et al. | 455/456.3 |
| 2006/0106930 A1 | 5/2006 | Shaffer | |
| 2007/0032247 A1 * | 2/2007 | Shaffer et al. | 455/456.1 |
| 2007/0299784 A1 * | 12/2007 | Kar | 705/80 |
| 2008/0133426 A1 * | 6/2008 | Porat et al. | 705/80 |
| 2008/0172307 A1 * | 7/2008 | Hurowitz et al. | 705/27 |

FOREIGN PATENT DOCUMENTS

| | | |
|---|---|---|
| JP | 2002197091 A2 | 7/2002 |
| JP | 2002245266 A | 8/2002 |
| KR | 0063874 | 11/2000 |
| WO | WO-2009048554 A1 | 4/2009 |

OTHER PUBLICATIONS

CNET News.com article entitled "New technology gives Web a voice" dated Jul. 20, 2001.*
CNET News.com article entitled "New technology gives Web a voice" dated Jul. 20, 2001.*
International Application Serial No. PCT/US2008/011552, International Search Report mailed Mar. 27, 2009.
"Auction Mapper for Ebay", [Online]. Retrieved from the Internet: <URL:http://www.auctionmapper.com>, Search for "IPod",(Sep. 14, 2007), 1 pg.
"Fatdoor: Get to know your Neighbors", [Online] Retrieved from the Internet: <URL:Http://www.fatdoor.com/>, Search for "University Ave, Palo Alto, CA",(Jun,. 14, 2007), 1 pg.

* cited by examiner

*Primary Examiner*—Jason B Dunham
*Assistant Examiner*—Courtney Stopp
(74) *Attorney, Agent, or Firm*—Schwegman, Lundberg & Woessner, P.A.

(57) ABSTRACT

In an example embodiment, a method is provided. The method may comprise receiving an auction item identifier from a global positioning system (GPS) apparatus. Auction data associated with the auction item identifier is accessed and transmitted to a voice portal server. The voice portal server may call a telephone number and receive a request to acquire the auction item.

10 Claims, 9 Drawing Sheets

ACQUISITION OF ONLINE AUCTION ITEMS THROUGH A GLOBAL POSITIONING SYSTEM

FIELD

The present disclosure relates generally to computer software. In an example embodiment, the disclosure relates to the acquisition of online auction items through a global positioning system.

BACKGROUND

An online auction is a publicly held sale over a computer network at which users may bid on or purchase auction items. A user may search for auction items and, in response to the search, a list of auction items from the search may be displayed. Each auction item may be located in different locations. In order for a user to determine the locations of the auction items, the user must laboriously read through all descriptions associated with the auction items. The list of descriptions makes the identification of auction item locations extremely difficult, especially when the user does not have much time to read through the descriptions, such as when the user is on the road.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

Methods, global positioning system (GPS) apparatuses, systems, and graphical user interfaces are provided for acquiring auction items. In brief, a GPS apparatus may display a map with locations of auction items. If a user wants to acquire a particular auction item displayed on the map, the user may select the auction item. As explained in more detail below, the user may then receive a telephone call from the online auction providing options to acquire the auction item. The user may then acquire the auction item through transactions over the telephone.

Example Embodiments

Figure 1:
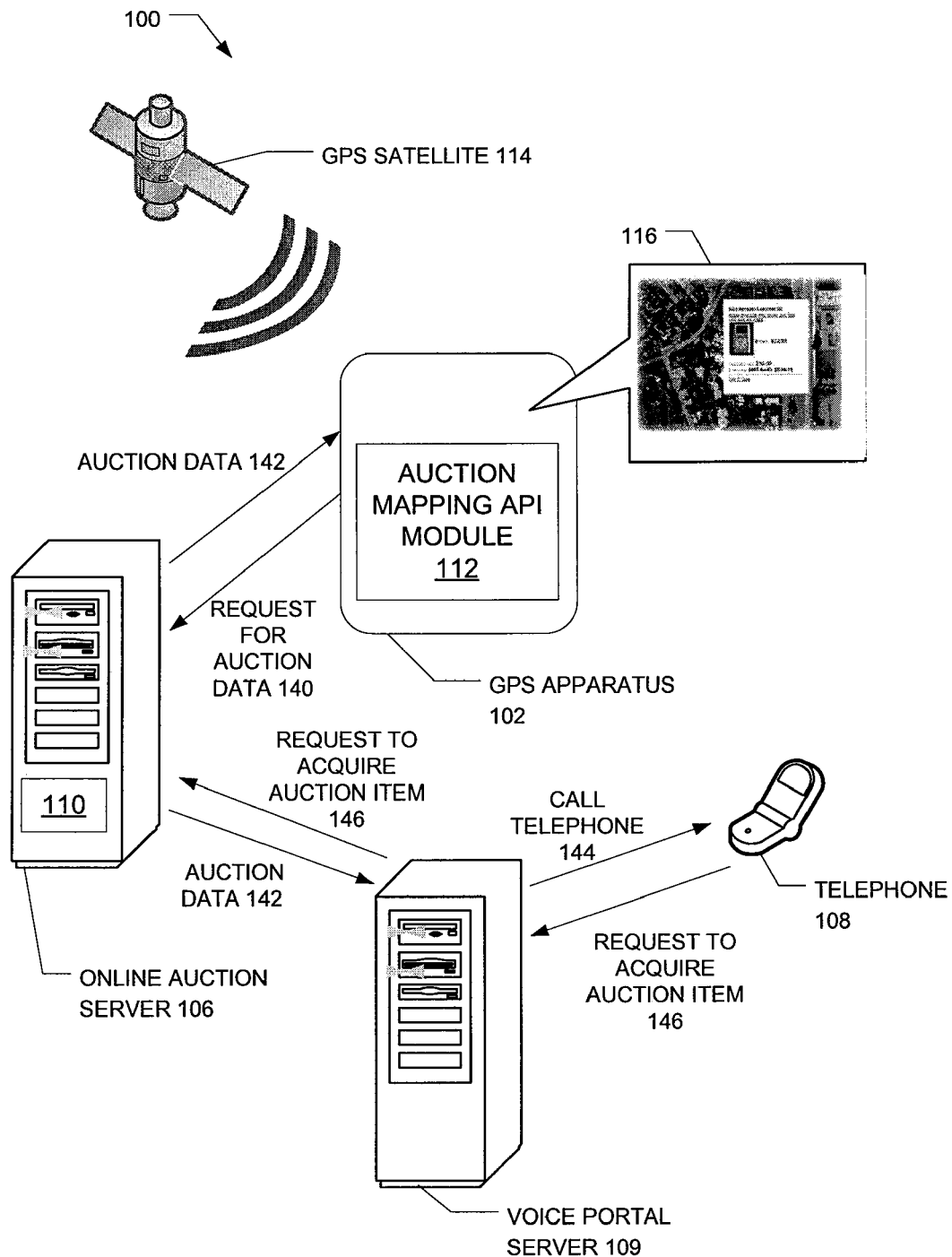
FIG. 1 is a diagram of an online auction mapping system, in accordance with an example embodiment.

FIG. 1 is a diagram of an online auction mapping system, in accordance with an example embodiment. Online auction mapping system 100 may include GPS satellite 114, GPS apparatus 102, online auction server 106, voice portal server 109, and telephone 108. To facilitate online auction transactions, GPS satellite 114, GPS apparatus 102, online auction server 106, voice portal server 109, and telephone 108 are in communication. Communication can be, for example, through a computer network, which can include a local area network (LAN), a Wide Area Network (WAN), Enhanced Data rates for GSM Evolution (EDGE) network, Internet, or through other connections. In another example, communication can be wireless, which can include Global System for Mobile Communications (GSM), Code Division Multiple Access (CDMA), GPS broadcast signal, and other wireless communication.

In general, GPS apparatus 102 may be a computing device that receives GPS broadcast signals from GPS satellite 114 and translates the GPS broadcast signals into position or location data (e.g., longitude and latitude). GPS apparatus 102 may include a display for providing location information. For example, as explained in more detail below, the display may include graphical user interface (GUI) 116 of a map with locations of auction items. Examples of GPS apparatus 102 include GPS navigation systems, computers with GPS receivers, personal digital assistants, mobile phones, and other GPS apparatuses. In an example embodiment, GPS apparatus 102 is portable. Examples of portable GPS apparatuses include mobile computers (e.g., laptop computers), mobile phones, personal digital assistants, handheld game consoles, digital audio players, and other GPS apparatuses.

As shown in FIG. 1, GPS apparatus 102 includes auction mapping application programming interface (API) module 112. As explained in more detail below, auction mapping API module 112 may be configured to retrieve locations of auction items and to map the locations of the auction items on a map. A user may input a search query through GPS apparatus 102 to find one or more auction items on an online auction that match the search query. Briefly, an online auction is a publicly held sale over a computer network at which users may bid on or purchase auction items. Auction items may include goods, digital goods, services, properties, locations of auction kiosks, and other auction items. Examples of goods include electronic devices, toys, cars, and other goods. Examples of digital goods may include digital music, video files, and other digital goods. Services may include, for example, gardening services, jobs, and other services. Auction kiosks are stores that assist a user to sell auction items on online auctions.

GPS apparatus 102 transmits the search query to online auction server 106. As shown in FIG. 1, the search query, along with the location of GPS apparatus 102, may be included in request for auction data 140, which is transmitted from the GPS apparatus to online auction server 106. Online auction server 106 is a computer server that hosts online auction application module 110. Online auction module 110 is an application software that handles the transactions associated with an online auction. In response to receiving the request, as explained in more detail below, online auction server 106 searches for auction items that match the search query and transmits auction data 142 from the search to GPS apparatus 102. Auction data 142 includes a variety of data associated with one or more auction items. For example, auction data 142 may include item descriptions, item prices, metadata, item locations, user identifiers, auction item identifiers, and other data associated with the auction item. With auction data 142, GPS apparatus 102 may then display the locations of auction items that match the search query on a map.

Still referring to FIG. 1, a user may thereafter select one or more auction items identified on the map to acquire, and GPS apparatus 102 transmits the selection to online auction server 106. In response, online auction server 106 accesses auction data 142 associated with the selection and transmits the auction data to voice portal server 109. In general, voice portal server 109 delivers content to telephone 108. Voice portal server 109 may host a variety of voice-based applications, such as voice recognition applications and directory assistance applications. Voice portal server 109 receives auction data 142 and calls telephone 108, which may belong to the user of GPS apparatus 102. Voice portal server 109 then provides a voice rendering of the auction data to telephone 108. For example, voice portal server 109 may call telephone 108 and provide a voice rendering of an identification of the selected auction item, a price associated with the auction item, and a description of the auction item. Voice portal server 109 may additionally provide options to acquire the auction item. Through the use of telephone 108, a user can make a request to acquire auction item 146, which is transmitted to voice portal server 109. Voice portal server 109 then transmits or relays request to acquire auction item 146 to online auction server 106. Upon receiving request to acquire auction item 146, online auction server 106 completes the transaction associated with the acquisition of the auction item.

Although a client-server architecture is used in the example embodiment shown in FIG. 1, it should be appreciated that other architectures, like a distributed architecture or peer-to-peer architecture, can also be used for handling transactions associated with an online auction.

Figure 2:
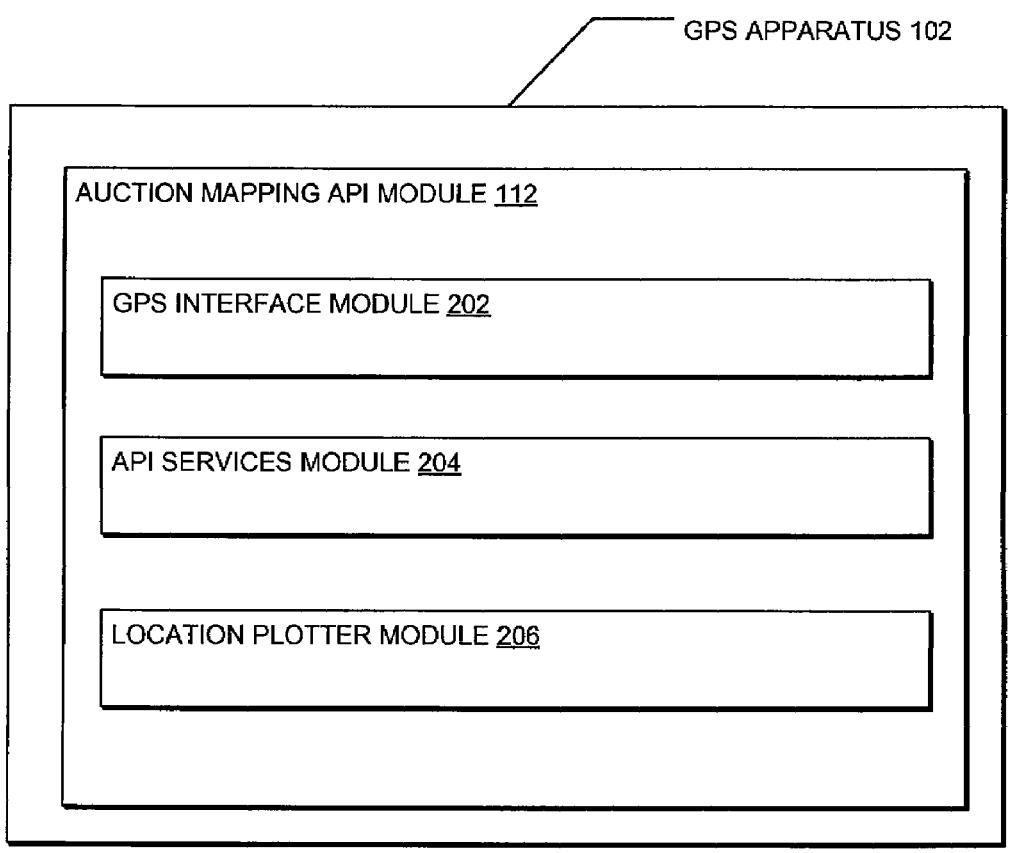
FIG. 2 is a simplified block diagram of modules included in an GPS apparatus, in accordance with an example embodiment.

FIG. 2 is a simplified block diagram of modules included in an GPS apparatus, in accordance with an example embodiment. GPS apparatus 102 includes auction mapping API module 112 that manages the software processes and/or services associated with the acquisition of an auction item on an online auction. As shown in FIG. 2, these software processes and/or services may include GPS interface module 202, API services module 204, and location plotter module 206. GPS interface module 202 interfaces with other modules within GPS apparatus 102 that determine the location of the GPS apparatus. Location may include a variety of descriptions that identify a specific place, area, or point on a map. Location may, for example, include longitude and latitude. In another example, location may include the street address of a location. In still another example, location may be a zip code. GPS interface module 202 is configured to receive the location of GPS apparatus 102. In other words, auction mapping API module 112 receives the location of GPS apparatus 102 by way of GPS interface module 202.

API services module 204 is configured to process a variety of transactions associated with the acquisition of one or more auction items on an online auction. For example, as explained in more detail below, API services module 204 may be configured to receive a search query associated with the online auction and may transmit a request for auction data. API services module 204 may further receive the auction data in response to transmitting the request. Furthermore, as explained in more detail below, API services module 204 may receive a selection of the auction item and transmit an auction item identifier that is associated with the auction item to an online auction server. With the receipt of the location of the auction item and the auction data, location plotter module 206 is configured to plot the location of one or more auction items on a map.

It should be appreciated that in other example embodiments, auction mapping API module 112 may include fewer or more modules apart from those shown in FIG. 2. For example, GPS interface module 202 may be integrated together with API services module 204 to form one module.

Figure 3:
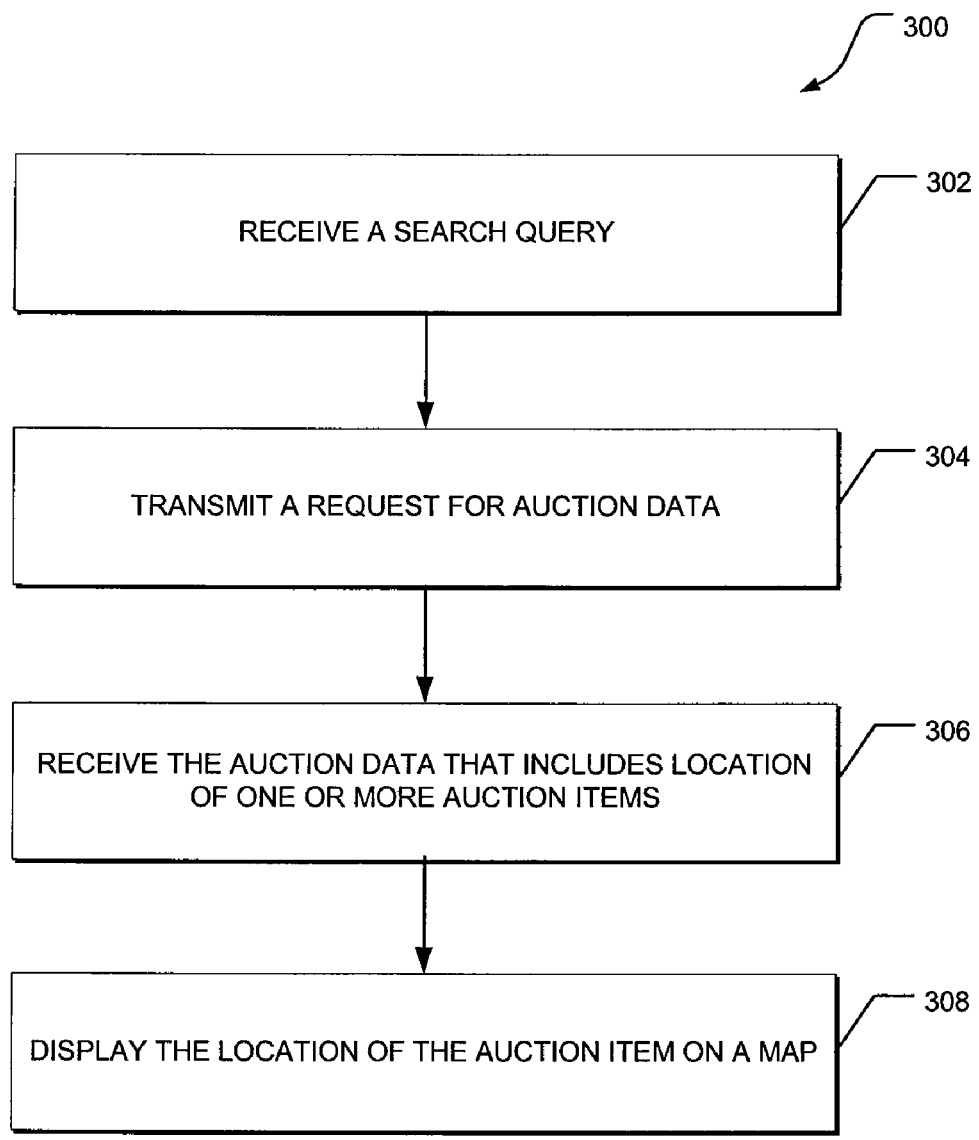
FIG. 3 is a flow diagram of a general overview of a method, in accordance with an example embodiment, for acquiring an auction item with the use of a GPS apparatus.

FIG. 3 is a flow diagram of a general overview of a method, in accordance with an example embodiment, for acquiring an auction item with the use of a GPS apparatus. In an example embodiment, method 300 may be implemented by the auction mapping API module of FIG. 2, employed in a GPS apparatus, such as the GPS apparatus shown FIGS. 1 and 2. As shown in FIG. 3, in an example embodiment, a search query is received at 302. The search query is associated with an online auction and may include a variety of alphanumeric characters and symbols associated with the online auction that may be searched. For example, search query may include keywords, texts, sentences, query languages, numbers, questions, equations, and other search queries. In an example, the search query may be used to search for titles of an auction item. In another example, the search query may be used to search for descriptions of an auction item. It should be noted that the search query may be provided by a user. In an example embodiment, the user may input the search query in the GPS apparatus, for example, with the use of a touch screen on the GPS apparatus.

At 304, the GPS apparatus may then transmit a request for auction data to the online auction server. The request for online auction data includes the search query. In response to the transmission, the GPS apparatus at 306 receives auction data from the online auction server that includes the locations of one or more auction items that satisfy the search query. The auction data may additionally include descriptions, titles, bid prices, shipping costs, and other auction data associated with auction items. With the auction data, the GPS apparatus may then display the locations of the auction items on a map at 308.

Figure 4:
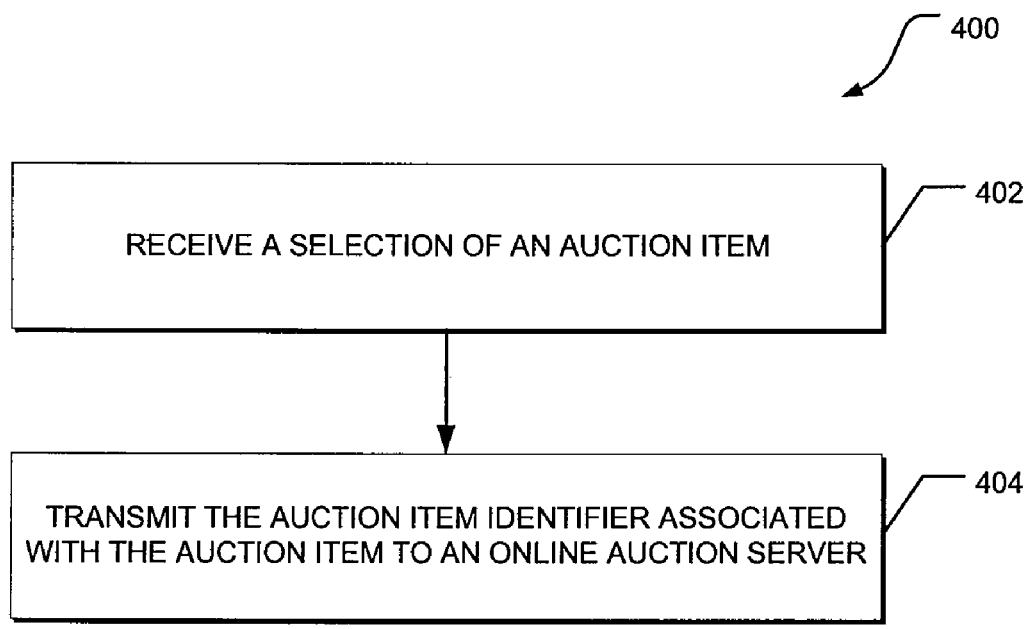
FIG. 4 is a flow diagram of a general overview of a method, in accordance with an example embodiment, for acquiring an auction item with the locations of the auction items displayed.

FIG. 4 is a flow diagram of a general overview of a method, in accordance with an example embodiment, for acquiring an auction item with the locations of the auction items displayed. In an example embodiment, method 400 may be implemented by auction mapping API module of FIG. 2, employed in a GPS apparatus, such as the GPS apparatus shown FIGS. 1 and 2. With the locations of the auction items displayed, a user may select one or more auction items to acquire. The user may, for example, select the auction items with the use of a touch screen on the GPS apparatus. In turn, as shown in FIG. 4, the GPS apparatus receives the selection of an auction item at 402. The auction item is identified by an auction item identifier. The auction item identifier is data that refers to or establishes the identity of a selected auction item. The auction item identifier may include a variety of alphanumeric code.

For example, the auction item identifier may be a unique numerical value or alphanumeric string assigned to a particular auction item. After the selection is received, the GPS apparatus transmits the auction item identifier associated with the selected auction item to an online auction server at 404 for further processing, as described in more below.

Figure 5:
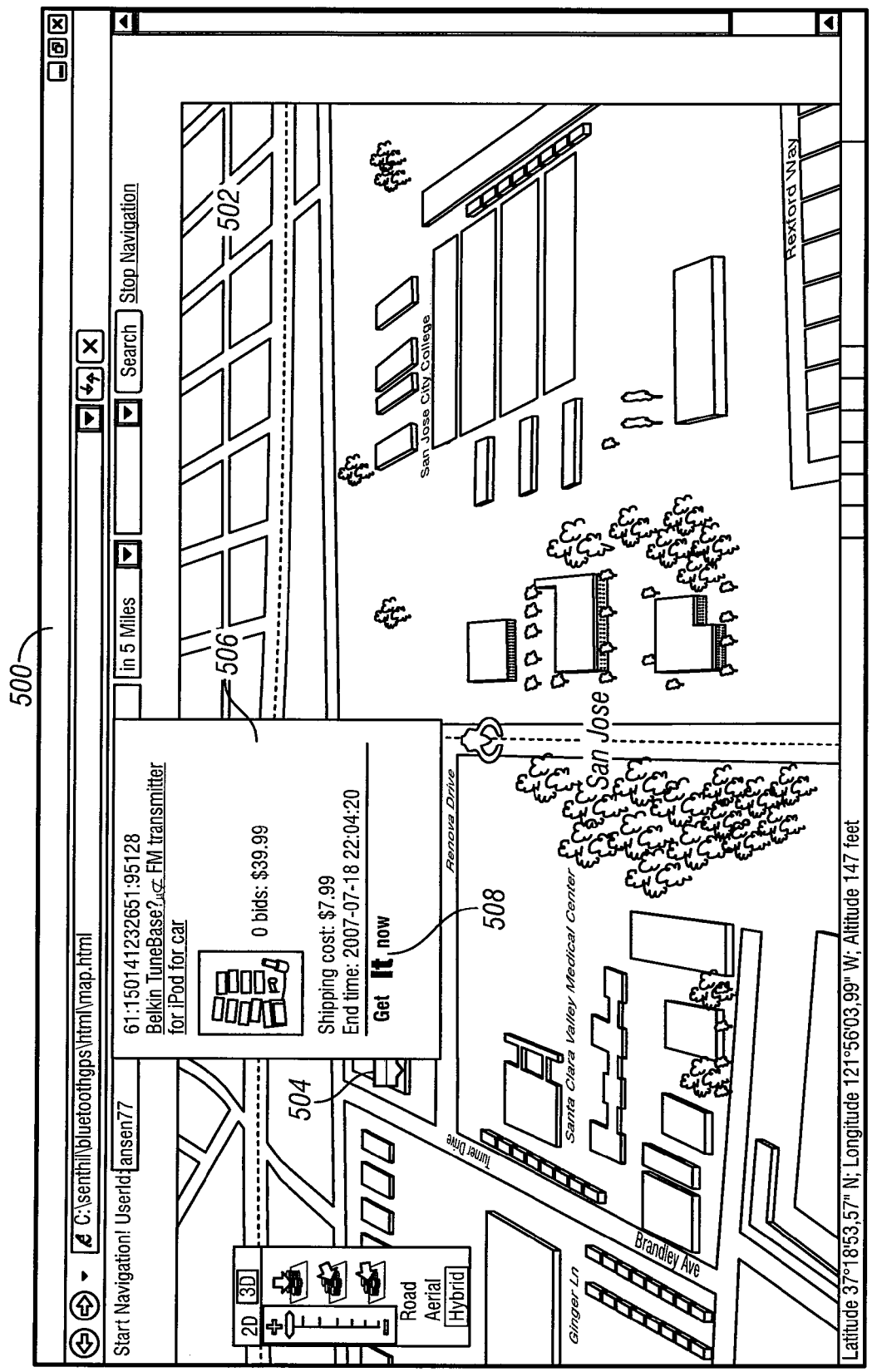
FIG. 5 is a diagram of a graphical user interface, in accordance with an example embodiment, of a map with locations of auction items.

FIG. 5 is a diagram of a graphical user interface, in accordance with an example embodiment, of a map with locations of auction items. FIG. 5 illustrates an example of graphical user interface 500 that may be displayed by a GPS apparatus. As shown, graphical user interface 500 includes map 502. Additionally included are icon region 504 and detail region 506 that are overlaid over map 502. Icon region 504 identifies an auction item and the position of the icon region relative to map 502. In brief, icon region 504 identifies a location of the auction item. For example, icon region 504 is positioned close to the intersection of two streets, as shown on map 502. As such, the auction item is located close to the intersection of two streets.

Graphical user interface 500 also may include detail region 506. In an example embodiment, detail region 506 is generated or displayed in response to a selection of icon region 504. For example, graphical user interface 500 initially includes only icon region 504 overlaid over map 502. If a user wants more information about the auction item associated with icon region 504, the user may select the icon region with, for example, a mouse or touch screen. In response to the selection of icon region 504, detail region 506 is displayed. Detail region 506 may include auction data associated with the auction item. For example, as shown in FIG. 5, detail region 506 includes a title, an image, a shipping cost, and other auction data associated with the auction item.

In addition to the auction data, a portion of detail region 506 may enable a selection of the auction item to acquire, in accordance with an example embodiment. For example, detail region 506 may include acquire region 508, which is illustrated as a "Get IT now" button. As shown in FIG. 5, acquire region 508 is located within detail region 506. However, it should be noted that acquire region may also be located outside of detail region 506. The acquire region 508 or this portion of detail region 506 enables a user to initiate the acquisition of the auction item through a single input command. For example, the user may make the selection by a single click on acquire region 508 with a mouse or by touching the acquire region once on a display. As explained in more detail below, the user may receive a telephone call. The user may answer the telephone call and acquire the auction item through the telephone call. Accordingly, in an example embodiment, acquire region 508 or a portion of detail region 506 may enable the initialization of a call to a telephone number through a single input command.

It should be appreciated that any number of suitable layouts can be designated for region and button layouts illustrated above as FIG. 5 does not represent all possible layout options available. The displayable appearance of the regions and buttons (regions 504, 506, and 508) can be defined by a variety of geometric shapes (e.g., rectangle, square, circle, triangle, etc.), alphanumeric characters (e.g., A, v, t, Q, 1, 9, 10, etc.), symbols (e.g., $, *, @, Ω, ∞, etc.), shading, pattern (e.g. solid, hatch, stripes, dots, etc.), and color. Furthermore, for example, acquire region 508 or other regions, may be omitted or dynamically assigned. It should also be appreciated that the regions can be fixed or customizable. In addition, a GPS apparatus may have a fixed set of layouts, utilize a defined protocol or language to define a layout, or an external structure can be reported to the GPS apparatus that defines the layout. Finally, clicking or selecting on a region or button of graphics user interface as discussed above may trigger code to cause the functionality described herein.

Figure 6:
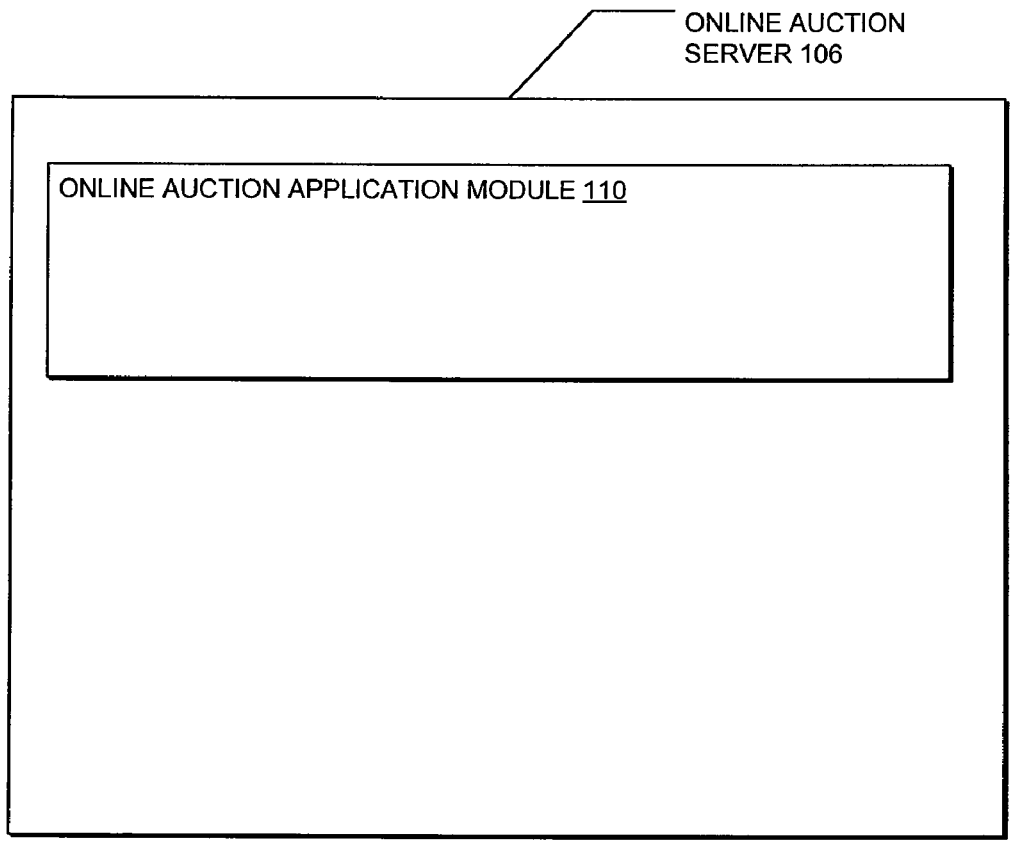
FIG. 6 is a simplified block diagram of a module included in an online auction server, in accordance with an example embodiment.

FIG. 6 is a simplified block diagram of a module included in an online auction server, in accordance with an example embodiment. Online auction server 106 includes online auction application module 110 that basically handles the transactions associated with an online auction. For example, as explained in more detail below, online auction application module 110 may communicate with a GPS apparatus to acquire an auction item and may also facilitate communication between the GPS apparatus and a voice portal server.

Figure 7:
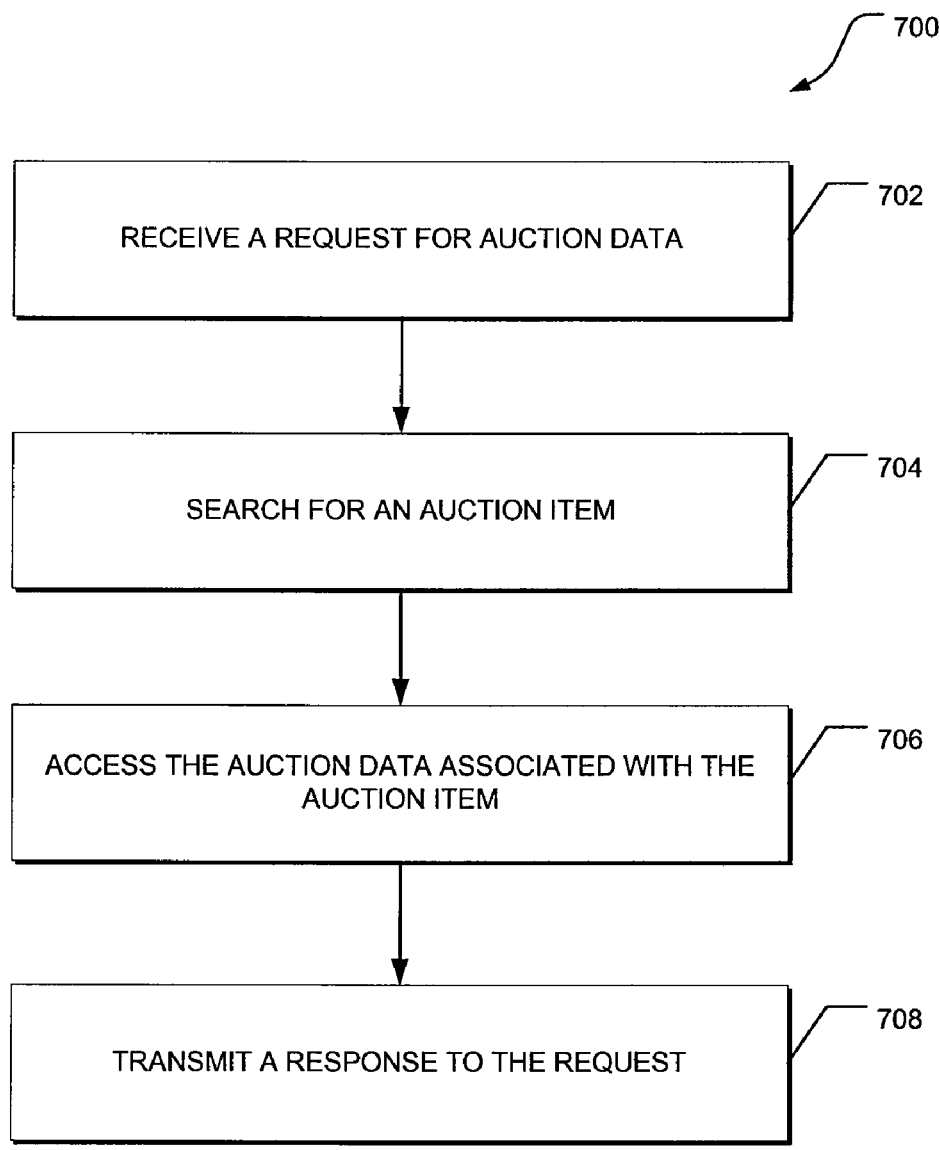
FIG. 7 is a flow diagram of a general overview of a method, in accordance with an example embodiment, for accessing auction data from an online auction server.

FIG. 7 is a flow diagram of a general overview of a method, in accordance with an example embodiment, for accessing auction data from an online auction server. In an example embodiment, method 700 may be implemented by online auction application module 110 of FIG. 6, employed in an online auction server, such as online auction server 106 shown FIGS. 1 and 6. As described above, a user may initially submit a search query to search for one or more auction items within a particular location that satisfy the search query. In turn, as shown in FIG. 7, the online auction server or online auction application module receives a request from the GPS apparatus for auction data at 702. In an example embodiment, the request includes a search query and a location. The location may be of the GPS apparatus or may be an arbitrary location specified by the user. In an example embodiment, after the location is received, the location may be converted into a location format that is used by or acceptable to the online auction server. For example, the location may be initially in longitude and latitude and the online auction server may convert the longitude and latitude into a corresponding zip code.

At 704, the online auction server may then search for one or more auction items based on the received search query and location. In an example, the online auction server may search for auction items in a database that satisfy the search query and match a particular zip code. In another example, the online auction server may search for auction items located in an area defined by a radius, where the longitude and latitude from the request define the center of the area. After the auction item is located, the auction data associated with the auction item is accessed at 706. To access the auction data, the auction data may be retrieved from a database. As described above, the auction data may include the title, description, current bid price, shipping cost, initial bid price, and other auction data. The auction data may additionally include a location of the auction item. At 708, online auction server then transmits a response to the request for auction data. Here, the response includes the auction data and the response is transmitted to the GPS apparatus.

Figure 8:
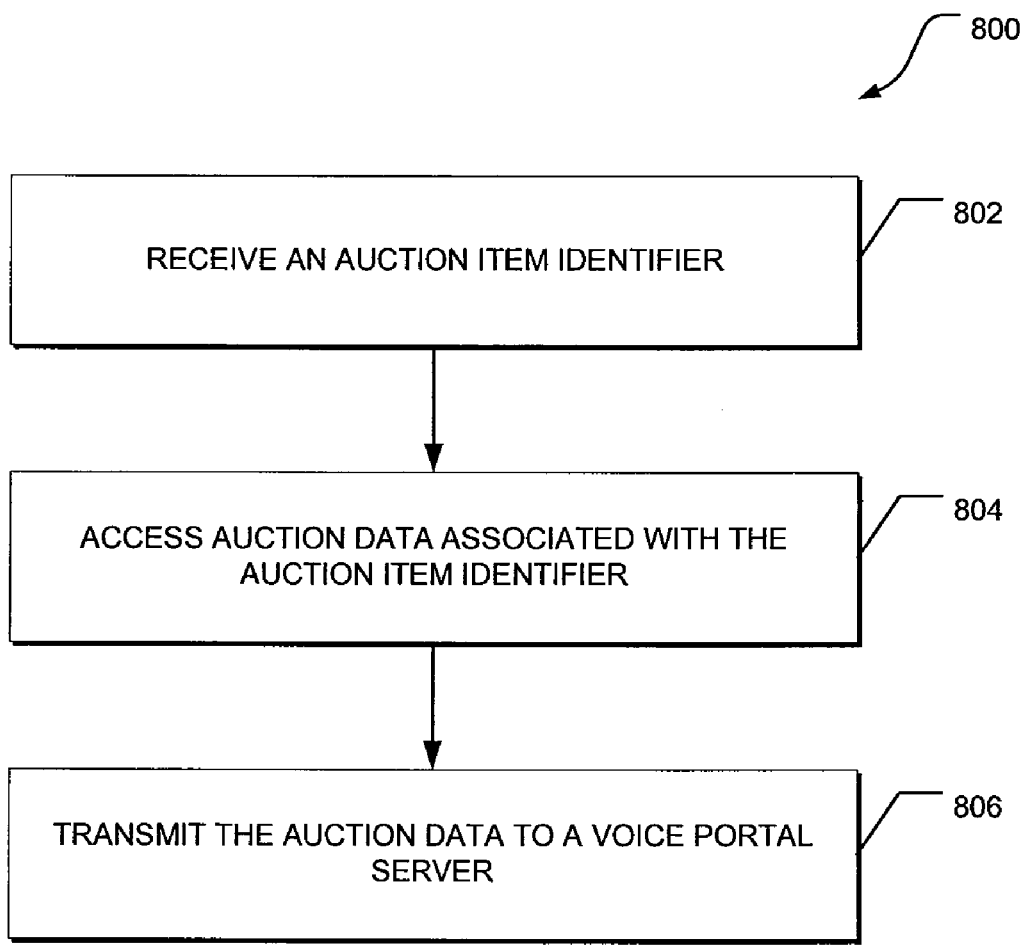
FIG. 8 is a flow diagram of a general overview of a method, in accordance with an example embodiment, for accessing auction data from an online auction server in response to a selection of an auction item.

FIG. 8 is a flow diagram of a general overview of a method, in accordance with an example embodiment, for accessing auction data from an online auction server in response to a selection of an auction item. In an example embodiment, method 800 may be implemented by online auction application module 110 of FIG. 6, employed in an online auction server, such online auction server 106 shown FIGS. 1 and 6. As described above, a user may select an auction item to acquire through the use of a GPS apparatus. In turn, as shown in FIG. 8, the online auction server or online auction application module receives an auction item identifier, which identifies the selected auction item, from the GPS apparatus at 802.

With the receipt of the auction item identifier, the online auction server then accesses the auction data associated with the auction item identifier at 804. For example, access may include the retrieval of the auction data from a database. Here, in an example embodiment, the auction data may include a user identifier. The user identifier is data that refers to or establishes the identity of a user associated with the acquisition or transaction (e.g., a buyer). As described in more detail below, the user identifier may be used to locate a telephone number associated with the user. In another example embodiment, the auction data may additionally include the telephone number associated with the user. At 806, the auction data is then transmitted to a voice portal server.

As discussed above, a voice portal server generally delivers content to a telephone. Here, the voice portal server receives auction data from the online auction server. This auction data is associated with one or more auction items that are selected by a user for acquisition. The auction data may include a user identifier and/or telephone number. In an example embodiment, the user may be registered with the voice portal server, and information associated with the user, such as telephone number, may be stored in the voice portal server. As a result, the telephone number of a user stored on the voice portal server may be located with the use of the user identifier. For example, the voice portal server may search for and retrieve a telephone number stored in the voice portal server that matches a particular user identifier.

With the telephone number, the voice portal server then calls the telephone with the telephone number. The user with the telephone receives the call from the voice portal server and may then bid on or place an order for the auction item through the telephone. For example, the voice portal server may call the telephone and provide a voice rendering of the auction data, such as a description and current bid of the auction item. The voice portal server may also provide options such that the user may acquire the auction item. Such options may include, for example, placing a bid on the auction item, buying the auction item, and placing the auction item on hold. Other options may include canceling a bid, changing an account of the user, and other options.

With the options provided, the user may make a request to acquire the auction item. The request may be a voice request or an input from the telephone (e.g., a telephone key). The voice portal server receives the request to acquire the auction item and transmits the request to the online auction server. If the request is a voice request, then voice portal server may apply voice recognition to convert the voice request into a data request, which is subsequently transmitted to the online server. In turn, the online auction server receives the request to acquire the auction item from the voice portal server and handles the transactions such that the user can acquire the auction item (e.g., makes a bid on the auction item, directly purchase the auction item, and other transactions).

Figure 9:
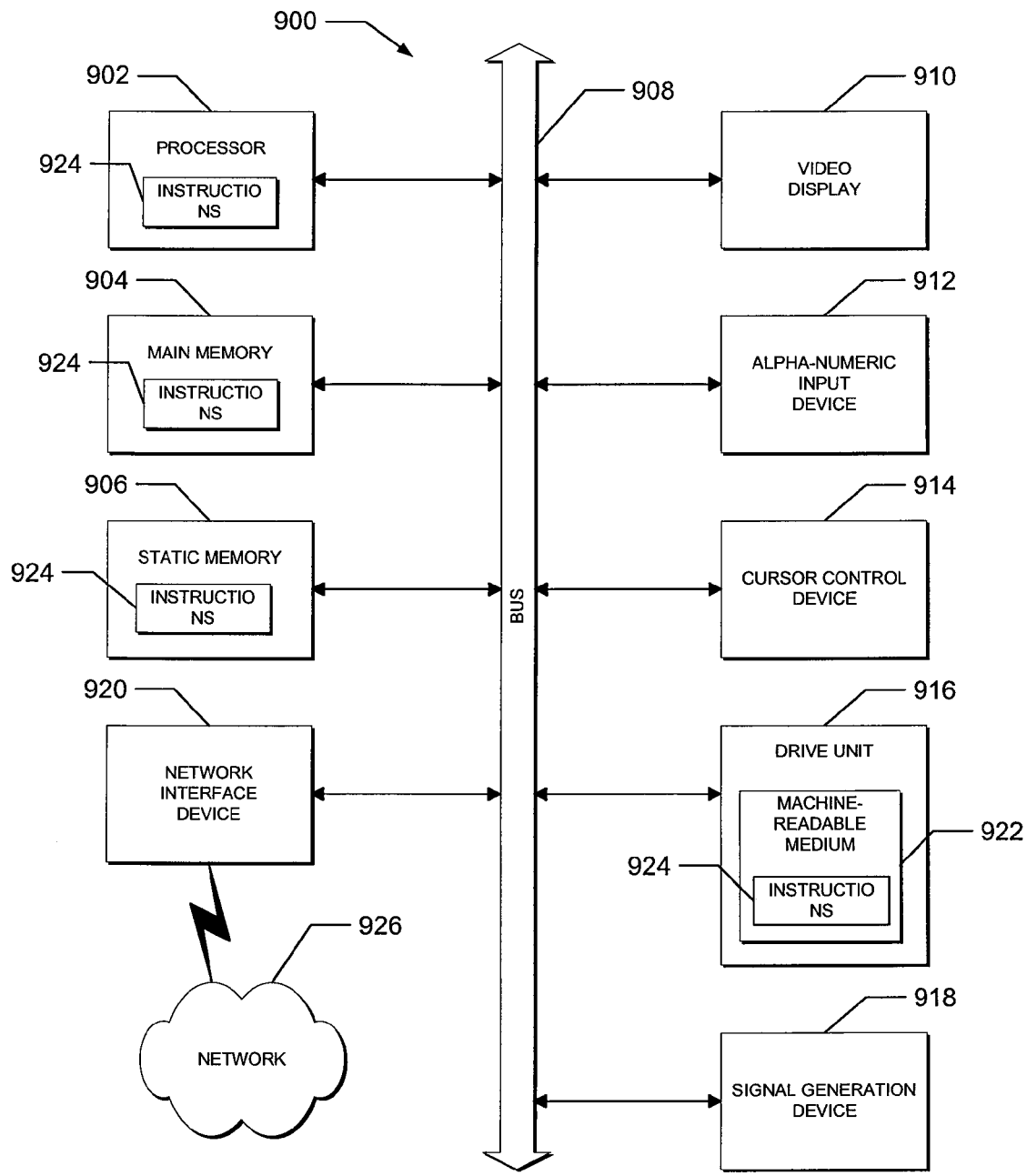
FIG. 9 is a simplified block diagram of a machine or apparatus in the example form of computer system within which a set of instructions, for causing the machine to perform any one or more of the methodologies discussed herein, may be executed.

FIG. 9 is a simplified block diagram of a machine or apparatus in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes processor 902 (e.g., a central processing unit (CPU), a graphics processing unit (GPU) or both), main memory 904 and static memory 906, which communicate with each other via bus 908. Computer system 900 may further include video display unit 910 (e.g., a plasma display, a liquid crystal display (LCD) or a cathode ray tube (CRT)). Computer system 900 also includes alphanumeric input device 912 (e.g., a keyboard), user interface (UI) navigation device 914 (e.g., a mouse), disk drive unit 916, signal generation device 918 (e.g., a speaker) and network interface device 920.

Disk drive unit 916 includes machine-readable medium 922 on which is stored one or more sets of instructions and data structures (e.g., software 924) embodying or utilized by any one or more of the methodologies or functions described herein. Software 924 may also reside, completely or at least partially, within main memory 904 and/or within processor 902 during execution thereof by computer system 900, main memory 904 and processor 902 also constituting machine-readable, tangible media.

Software 924 may further be transmitted or received over network 926 via network interface device 920 utilizing any one of a number of well-known transfer protocols (e.g., HTTP).

While machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories and optical and magnetic media.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving an auction item identifier from a global positioning system (GPS) apparatus;
   accessing first auction data associated with the auction item identifier; and
   transmitting the first auction data to a voice portal server, the voice portal server calls a telephone number, and in the call from the voice portal server, providing an option to acquire the auction item and receiving a request to acquire the auction item based on the option provided.

2. The method of claim 1, wherein the voice portal server provides a voice rendering of the first auction data.

3. The method of claim 1, further comprising receiving a request from the voice portal server to acquire the auction item.

4. The method of claim 1, further comprising:
   receiving a request for second auction data, the request including a search query and a location of the GPS apparatus;
   converting the location of the GPS apparatus to a zip code;
   searching for the auction item based on the search query and the zip code;
   retrieving the second auction data that includes a location of the auction item; and
   transmitting a response to the request for the second auction data, the response including the second auction data.

5. The method of claim 1, wherein the first auction data includes a user identifier, the telephone number being associated with the user identifier.

6. The method of claim 1, wherein the request to acquire the auction item is a voice request.

7. A machine-readable medium comprising instructions, which when implemented by one or more processors perform the following operations:
   receiving a request for first auction data, the request including a search query and a location of a global positioning system (GPS) apparatus;
   searching for an auction item based on the search query and the location of the GPS apparatus;
   accessing the first auction data associated with the auction item, the first auction data including a location of the auction item and an auction item identifier;
   transmitting a response to the request, the response including the first auction data;
   receiving the auction item identifier from the GPS apparatus;
   accessing second auction data associated with the auction item identifier; and
   transmitting the second auction data to a voice portal server, the second auction data including a user identifier, the voice portal server calls a telephone number associated with the user identifier, and in the call from the voice portal server, providing an option to acquire the auction item and receiving a voice request to acquire the auction item based on the option provided.

8. The machine-readable medium of claim 7, further performing the operation of receiving a request from the voice portal server to acquire the auction item.

9. A method comprising:
   receiving an auction item identifier from a global positioning system (GPS) apparatus, the auction item identifier establishing an identity of a selected auction item;
   accessing auction data associated with the auction item identifier, the auction data including a user identifier that identifies a user associated with a transaction; and
   transmitting the auction data to a voice portal server, the voice portal server locates a telephone number based on the user identifier and calls a telephone with the telephone number, and in the call from the voice portal server, providing a voice rendering of the auction data to the telephone, the voice rendering providing an option to acquire the auction item, and receiving a voice request from the telephone to acquire the selected auction item based on the option; and
   receiving a request from the voice portal server after the transmission of the auction data to acquire the selected auction item.

10. The method of claim 9, further comprising:
    receiving an additional request for additional auction data, the additional request including a search query and a location of the GPS apparatus;
    converting the location of the GPS apparatus to a zip code;
    searching for the selected auction item based on the search query and the zip code;
    retrieving the additional auction data that includes a location of the selected auction item; and
    transmitting a response to the additional request for the additional auction data, the response including the additional auction data.

* * * * *